US009948726B2

United States Patent
Narayanan (10) Patent No.: US 9,948,726 B2
(45) Date of Patent: Apr. 17, 2018

(54) RECONSTRUCTION OF STATES ON CONTROLLER FAILOVER

(71) Applicant: Avaya Inc., Basking Ridge, NJ (US)

(72) Inventor: Srinivasan Narayanan, Kothrud (IN)

(73) Assignee: Avaya Inc., Basking Ridge, NJ (US)

( * ) Notice: Subject to any disclaimer, the term of this patent is extended or adjusted under 35 U.S.C. 154(b) by 832 days.

(21) Appl. No.: 13/932,004

(22) Filed: Jul. 1, 2013

(65) Prior Publication Data
US 2015/0006741 A1 Jan. 1, 2015

(51) Int. Cl.
*H04L 29/08* (2006.01)
*H04L 29/14* (2006.01)

(52) U.S. Cl.
CPC ............ *H04L 67/142* (2013.01); *H04L 69/40* (2013.01)

(58) Field of Classification Search
CPC .............................. H04L 67/142; H04L 69/40
USPC .......................................................... 709/227
See application file for complete search history.

(56) References Cited

U.S. PATENT DOCUMENTS

| 6,061,807 | A  | * | 5/2000 | Albert | H04L 69/40 714/2 |
| 6,907,035 | B1 | * | 6/2005 | Byers  | H04L 49/552 370/355 |
| 7,216,350 | B2 | * | 5/2007 | Martin | H04M 3/42 379/201.01 |
| 8,499,035 | B2 | * | 7/2013 | Roach  | H04L 67/24 709/203 |
| 8,661,077 | B2 | * | 2/2014 | Roach  | H04L 67/24 709/203 |
| 8,762,549 | B2 | * | 6/2014 | Foti   | H04L 67/142 709/222 |
| 8,930,553 | B2 | * | 1/2015 | Nissim | H04L 65/1006 709/228 |
| 8,930,768 | B2 | * | 1/2015 | Baker  | H04L 69/40 714/38.12 |
| 8,935,415 | B2 | * | 1/2015 | Nissim | H04L 65/1006 709/228 |
| 9,432,321 | B2 | * | 8/2016 | Steiner | H04L 51/16 |
| 2004/0114578 | A1 | * | 6/2004 | Soncodi | H04L 1/22 370/352 |
| 2004/0114744 | A1 | * | 6/2004 | Trossen | H04L 29/06027 379/201.01 |
| 2006/0036747 | A1 | * | 2/2006 | Galvin, Jr. | H04L 69/40 709/228 |
| 2006/0168334 | A1 | * | 7/2006 | Potti | H04L 67/1008 709/239 |
| 2007/0140262 | A1 | * | 6/2007 | Wang | H04L 29/06027 370/395.52 |
| 2007/0150600 | A1 | * | 6/2007 | Barsness | G06F 11/3447 709/227 |

(Continued)

FOREIGN PATENT DOCUMENTS

| CA | 2787370 A1 | * | 7/2011 | ............. H04L 67/14 |
| EP | 1703694 A2 | * | 9/2006 | ......... H04L 63/0807 |
| EP | 1868319 A1 | * | 12/2007 | ......... H04L 41/0213 |

*Primary Examiner* — Kostas Katsikis
(74) *Attorney, Agent, or Firm* — Sheridan Ross P.C.

(57) ABSTRACT

Systems and methods for feature reconstruction as well as dialog preservation during a server failure are described. Specifically, failover mechanisms are described which enable an endpoint to remain involved in a communication session as well as have communication features preserved during the communication session even though a server initially providing those communication features has failed. A survivable server is also described that has the ability to reconstruct features as well as dialogs based on state information received from the endpoint involved in the communication session.

20 Claims, 6 Drawing Sheets

(56) References Cited

U.S. PATENT DOCUMENTS

| | | | |
|---|---|---|---|
| 2007/0220302 A1* | 9/2007 | Cline | G06F 11/2035 714/4.1 |
| 2008/0080525 A1* | 4/2008 | Chatilov | H04L 65/105 370/401 |
| 2009/0003320 A1* | 1/2009 | Luo | H04L 45/00 370/352 |
| 2009/0196183 A1* | 8/2009 | Kakadia | H04L 12/14 370/237 |
| 2010/0299551 A1* | 11/2010 | Han | H04L 65/105 714/4.1 |
| 2010/0316199 A1* | 12/2010 | Martin, II | H04M 3/42221 379/88.08 |
| 2011/0029812 A1* | 2/2011 | Lu | G06F 11/1474 714/18 |
| 2011/0066694 A1* | 3/2011 | Barrett | H04L 65/1069 709/207 |
| 2011/0179460 A1* | 7/2011 | Foti | H04L 67/14 725/109 |
| 2011/0179461 A1* | 7/2011 | Foti | H04L 67/14 725/109 |
| 2011/0213896 A1* | 9/2011 | Merino Vazquez | H04L 29/12188 709/245 |
| 2013/0036189 A1* | 2/2013 | Stevens, III | H04L 65/1006 709/217 |
| 2013/0054806 A1* | 2/2013 | Francis | H04L 67/1002 709/226 |
| 2013/0066948 A1* | 3/2013 | Colrain | H04L 67/146 709/203 |
| 2013/0066955 A1* | 3/2013 | Neel | H04L 67/146 709/203 |
| 2013/0159374 A1* | 6/2013 | Steiner | H04L 51/16 709/201 |
| 2013/0173812 A1 | 7/2013 | Ezell et al. | |
| 2013/0212242 A1* | 8/2013 | Mendiratta | H04L 65/1069 709/223 |
| 2013/0212298 A1* | 8/2013 | Bunch | H04L 45/42 709/244 |
| 2014/0095922 A1* | 4/2014 | Baker | H04L 67/14 714/4.2 |
| 2014/0101322 A1* | 4/2014 | Nissim | H04L 65/1006 709/227 |
| 2014/0101323 A1* | 4/2014 | Nissim | H04L 65/1006 709/228 |
| 2014/0115176 A1* | 4/2014 | Kamboh | H04L 67/142 709/228 |
| 2014/0214972 A1* | 7/2014 | Nemani | H04L 65/1006 709/206 |

* cited by examiner

RECONSTRUCTION OF STATES ON CONTROLLER FAILOVER

FIELD OF THE DISCLOSURE

The present disclosure is generally directed toward communications and more specifically directed toward state preservation in communications.

BACKGROUND

Various signaling protocols exist for establishing communications. For example, Session Initiation Protocol (SIP) is an open signaling protocol for establishing many kinds of real-time communication sessions, including voice, video, and/or instant messaging. Communication sessions may be carried out on any type of endpoint (e.g., a communication device such as a personal computer, laptop computer, Personal Digital Assistant (PDA), cellular phone, IM client, IP phone, traditional telephone, and so on). Endpoints may also be referred to as end devices or client devices, and can include mobile devices.

In some system architectures, one or more servers are used to provide communication features during a communication session between two or more endpoints. Sometimes the server(s) which provide the features during a communication session are configured as a Back-to-Back User Agent (B2BUA) or proxy server. In either configuration, there are often redundant servers to accommodate situations of network failure, server failure, server maintenance, etc. Problematically, however, there is no currently available solution to preserve dialog and state information (e.g., feature state, contact center state, and/or any non-call state) if a server fails during a communication session.

In particular, on failover from an active server to a backup server, the endpoints involved in the communication session will lose all dialog information. Furthermore, the backup server will not have access to the current feature state (e.g., non-call state) of the endpoints involved in the communication session. According to SIP standards, such as RFC 3261, the entire contents of which are hereby incorporated herein by reference, a dialog represents a peer-to-peer SIP relationship between two user agents. A dialog persists for some time and it is very important concept for user agents. Dialogs facilitate proper sequencing and routing of messages between SIP endpoints. Dialogs are often identified using Call-ID, From tag, and To tag. Messages that have these three identifiers same belong to the same dialog. The endpoints lose their dialog information because the servers originally involved in the communication session (active server) do not synchronize their memory with other servers (e.g., potential backup servers) because doing so would create a huge processing overhead. Thus, when a backup server takes over a communication session for a failed server, the backup server assumes the endpoint is idle; however, at the time of failover, the endpoint could have been part of one or many active calls. Unfortunately, because the backup server assumes the endpoint is idle, all of the dialog information for the calls will be lost.

SUMMARY

It is with respect to the above issues and other problems that the embodiments presented herein were contemplated. In particular, various solutions are provided to preserve features during failover (e.g., when one server previously providing one or more features to endpoints in a communication session fails and is replaced by a survivable server) and/or preserve dialog information during failover.

In some embodiments, a feature preservation method is provided, which basically provides the ability to preserve features active by an endpoint in connection with a communication session even after a primary server has failed. In particular, during failover, the endpoint may be configured to reach up to a survivable server and provide the endpoint's view of the feature state to the survivable server. The survivable server can then acknowledge the endpoint uplink, reconfigure itself to accommodate the endpoint's view of the feature state, active the necessary features, and then send down the new feature state update to the endpoint(s) involved in the communication session. In some embodiments, the feature preservation method and its steps can be performed as a background process, thereby enabling a user to continue with a communication session without being interrupted or made aware of the failure and failover.

In some embodiments, a dialog preservation method is provided, which basically enables a seamless transition between a failed primary server and a survivable server. The method generally addresses the challenges associated with having one or more B2BUAs involved in the communication session. Specifically, the dialog preservation method may comprise enabling the entities in the failover group to be made aware of each other (or at least their neighbors). In certain implementations, one central server may acts as the only neighbor to the rest of a plurality of application servers. As a non-limiting example, in some deployments it is common to have a central server own all the application sequencing and that central server will operate like a hub-spoke model, where the chain of servers in the call sequence will be A-B-A-C-A-D-A-E etc, where A is the central server and it will route the call to any application B,C,D,E as appropriate. The reason this is of interest is because A is the only neighbor of any application B, C, D, E, etc.

Accordingly, this neighbor awareness can be facilitated either by administration or by learning (e.g., by enabling each node in the failover group to execute a SIP OPTIONS method with its neighbors or any other method including proprietary signaling to learn about neighbors). Accordingly, if a message is routed to a server that has failed, then the neighbor immediately preceding this server detects this failure and reroutes the message to a survivable server. During the re-routing process, the route and/or Record-route headers of the re-routed message may be re-written with the address of an active member in the failover group, thereby enabling the successfully routing of the message to the survivable server. In some embodiments, the server that re-routes (e.g., changes the route headers of the re-routed message) will also watermark the re-routed message with a special header and/or parameter that indicates the re-routed message belongs to a reconstructed call. The purpose of the watermark is to enable the survivable server to know that the re-routed message is not a stray message, but that the re-routing server desires the survivable server to accept and process the re-routed message because some other server in a failover group has failed and the survivable server is the designated server to take over the communication session. Without the use of such a watermark, the survivable server may reject the re-routed message as a stray message if it strictly adheres to SIP standards. Once the survivable server receives the re-routed message, the survivable server can place the dialog in a partially reconstructed state, thereby enabling the survivable server to start providing features to the communication session.

As demonstrated above, it is one aspect of the present disclosure to enable entities to cover for each other when such entities are members of the same failover group. Specifically, each member of a failover group may be configured to identify itself via a module-ID or server-ID. The failover group itself may be identified by an application or app-ID.

It is another aspect of the present disclosure to enable an endpoint to detect a failover event by receiving a new server-ID during a communication session and detecting that the new server-ID is different from the server-ID originally used during establishment of the communication session. In response to making such a determination, the endpoint is further configured to publish its view of the in-progress communication session to the new server (e.g., the survivable server), thereby providing the new server with the endpoint's entire dialog and/or feature state. It should be noted that an in-progress session could mean calls, in which case dialog states are used. Feature states, on the other hand, could be a call forwarding setting. Therefore, in some embodiments, it is the endpoint sending up the states to the server without getting something from the server and detecting an out-of-state mode. In other words, the endpoint may be configured to unilaterally send its state (e.g., feature and/or dialog) to the server.

It is another aspect of the present disclosure to enable a survivable server to internally recreate feature states transparently and send down a confirmation of the reconstruction to endpoints involved in a communication session that has been the subject of the reconstruction. The transparent nature of this process helps ensure that the endpoint does not have to show any user-perceptible change as the session is silently moved from one server to another, all while maintaining communication features. Of course, the endpoint may show the user that the session has moved from one server to another, if the user desires to know what is happening in the background, for example.

It is another aspect of the present disclosure to tag a primary server on a per-call basis, thereby enabling reconstruction of partial lists of calls on an endpoint.

It is another aspect of the present disclosure to utilize Global Session Identifiers (GSIDs), Globally Routable UA URIs (GRUUs), and/or Endpoint View Headers (EPVs) to facilitate the methods disclosed herein. Details of GSIDs and GRUUS are further described in U.S. patent application Ser. No. 13/626,066 entitled "GLOBAL SESSION IDENTIFIER" to Mendiratta et al., the entire contents of which are hereby incorporated herein by reference. Details of EPVs are further described in U.S. patent application Ser. No. 13/485,604 entitled "SIP TRANSFER IN BACK-TO-BACK USER AGENT (B2BUA) ENVIRONMENT" to Ezell et al., the entire contents of which are hereby incorporated herein by reference.

As disclosed in those documents, the term "GSID" or "Global Session Identifier" may refer to any number, character, set of numbers, set of characters, alphanumeric sequence, string, or collection of elements that identify a communication session. The GSID may be randomly, pseudo-randomly, or sequentially generated in response to the creation of a new communication session. The term "GSID Header" or "Global Session ID Header", as used herein, may refer to any portion of a message that carries a GSID, multiple GSIDs, or information that describes an association between GSIDs. In some embodiments, it may be possible to include a first GSID, a second GSID, and a description of the reason why the first and second GSIDs have been associated within the Global Session ID Header.

While the term "header" is used to describe the portion of a message (e.g., SIP message, IP packet, etc.) that carries the identification information, it should be appreciated that such identification information may be included in a header, sub-header, footer, payload, or any other content-bearing portion of a message. Further still, the term GSID or Global Session Identifier may also be used to describe the header that carries the identification information of one or more communication sessions. Accordingly, session identification information may be referred to as a GSID or the container (e.g., header, footer, sub-header, payload, message body, etc.) of the identification information may be referred to as a GSID without departing from the scope of the present disclosure. Where the GSID is used to refer to the container of identification information, the GSID may include identification information for multiple sessions (e.g., a combination of session identifiers), information describing that an association between sessions has been created, and/or information describing why an association between sessions has occurred. Furthermore, an EPV parameter may correspond to a header value that provides a requester URI with information about the party to which the message is targeted.

In some embodiments, a method of facilitating a communication session is provided which generally comprises:

determining that a primary server involved in a communication session between at least a first endpoint and at least a second endpoint has failed during the communication session;

determining that a survivable server will replace the primary server;

providing information from the at least a first endpoint to the survivable server, where the information provided to the survivable server comprises state information about the communication session as viewed by the at least a first endpoint;

enabling the survivable server to reconstruct state information for the communication session based on the information received from the at least a first endpoint;

providing reconstruction information from the survivable server to the at least a first endpoint, where the reconstruction information provided to the at least a first endpoint comprises state information for the communication session as viewed by the survivable server; and enabling the at least a first endpoint to continue the communication session during the reconstruction of the state information.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
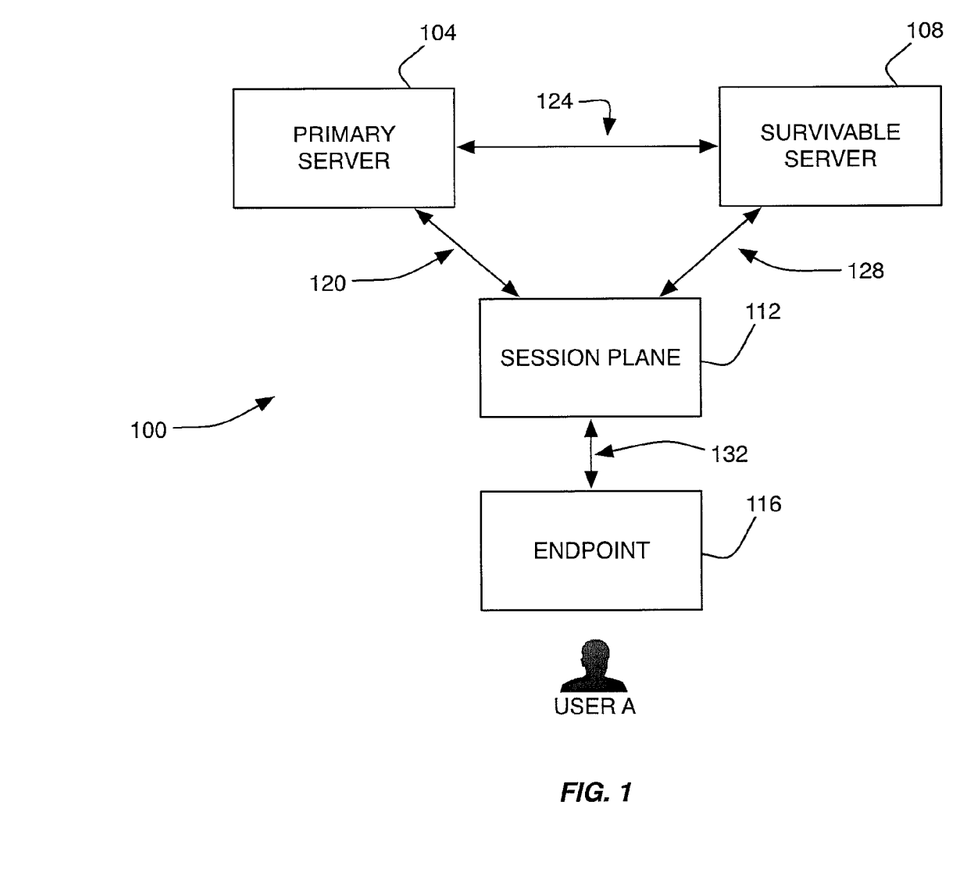
FIG. 1 is a block diagram of a communication system in accordance with embodiments of the present disclosure.

FIG. 1 shows an illustrative communication system 100 in accordance with at least some embodiments of the present disclosure. The communication system 100, as depicted, includes a primary server 104, a survivable server 108, a session plane 112, and an endpoint 116. Although only two servers are depicted as being in communication with the session plane 112, it should be appreciated that three, four, five, or more servers may be connectable to the endpoint via the session plane 112. In some embodiments, the session plane 112 and servers 104, 108 may be provided within a single or multiple communication networks (e.g., enterprise communication networks), where the servers 104, 108 and/or session plane 112 may be administered and controlled by a single enterprise entity or shared among a plurality of different enterprises. On the other hand, one, some, or all of the servers 104, 108 and/or session plane 112 may be logical functions inside of a physical server and their functions may be virtualized.

Figure 2:
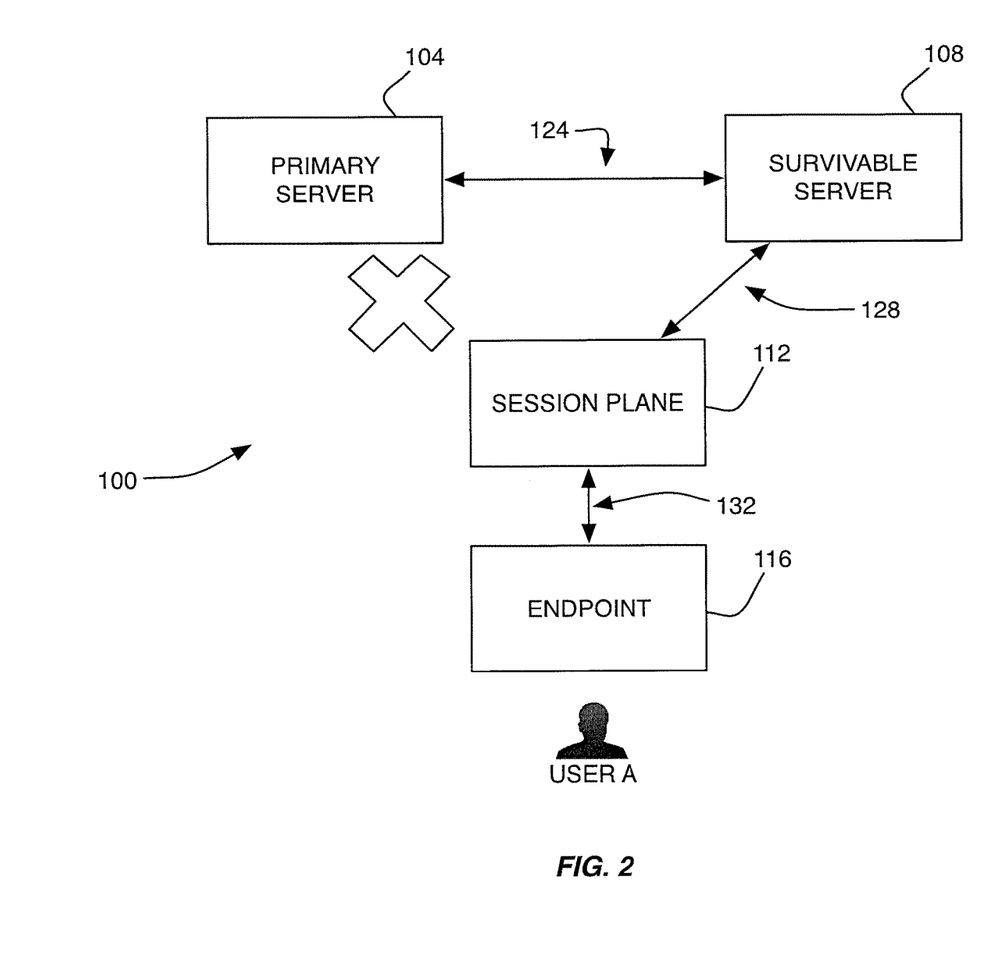
FIG. 2 is a block diagram of the communication system during failover in accordance with embodiments of the present disclosure.
Figure 3:
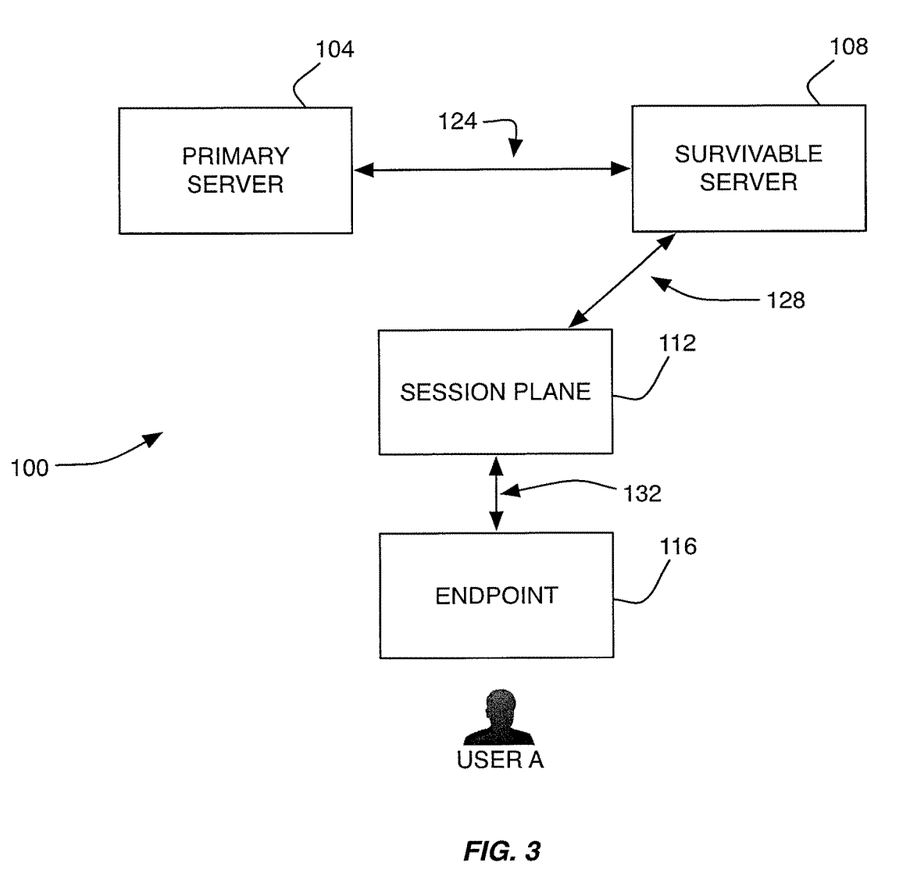
FIG. 3 is a block diagram of the communication system after failover in accordance with embodiments of the present disclosure.

It should also be appreciated that while only one endpoint 116 is depicted in FIGS. 1-3, embodiments of the present disclosure are not so limited. Rather, the depiction of a single endpoint 116 is for clarity purposes only and it should be appreciated that an endpoint 116 may be involved in one or many communication sessions (perhaps simultaneously) with one or multiple other endpoints and/or users. Embodiments of the present disclosure are depicting and describing the actions that can be taken by an endpoint 116, but it should be appreciated that such actions can be performed at multiple endpoints, which may or may not be connected directly to the session plane 112.

The endpoint 116, in some embodiments, corresponds to any type of known communication equipment such as a phone, a SIP phone, a personal computer (PC), a tablet, a laptop, a smart phone, an application running on one or more of the above, etc. Moreover, the endpoint 116 may include any collection of components that enable the user to exchange media (e.g., voice, video, etc.), data (e.g., emails, Short Message Service (SMS) messages, Multimedia Message Service (MMS) messages, files, presentations, documents, etc.), and other forms of communications with other endpoints.

In some embodiments, the endpoint 116 may be a part of an enterprise communication network along with the session plane 112, and servers 104, 108. In such a situation, the endpoint 116 and the other devices in the enterprise network may be administered according to policies of the enterprise network. In some embodiments, the endpoint 116 may correspond to a device owned and administered by the user, but is allowed to connect to the session plan 112 via link 132. Such an embodiment may also be referred to as a Bring Your Own Device (BYOD) embodiment.

In some embodiments, the primary server 104 and/or survivable server 108 are configured to provide or make features available to the endpoint 116 during a communication session. The servers 104, 108 can include a Private Branch eXchange (PBX), an enterprise switch, an enterprise server, combinations thereof, or other type of telecommunications system switch or server. The servers 104, 108 are preferably configured to execute telecommunication functions such as the suite of applications made available via Avaya Aura™ platform of Avaya, Inc., including Communication Manager™, Avaya Aura Communication Manager™, Avaya IP Office™, Communication Manager Branch™, Session Manager™, System Manager™, Multi-Vantage Express™, and combinations thereof.

As noted above, two or more servers 104, 108 may be provided in a single enterprise network or across multiple separate LANs, which are owned and operated by a single enterprise, but separated by broader communication network (e.g., the Internet). In some embodiments, the servers 104, 108 may comprise similar functionality, but may be provisioned for providing their features to only a subset of all enterprise users. For example, the primary server 104 may be authoritative for a first set of users, the survivable server 108 may be a backup for the primary server 104 for the first set of users, the survivable server 108 may be authoritative for a second set of users, and the primary server 104 may be a backup for the survivable server 108 for the second set of users.

Alternatively or additionally, multiple servers 104, 108 can support a common user community. For example, in geo-redundant and other applications where users aren't necessarily bound to a single application server, there may be a cluster of equivalent servers where a user and their endpoint 116 can be serviced by any server in the cluster and other servers in the cluster are configured to function as the survivable server 108.

The servers 104, 108 may both be configured to provide or make available features to the endpoint 116 during a communication session. The types of features that may be provided or made available via the servers 104, 108 include, without limitation, twinning features, extension-to-cellular features (e.g., EC500), call forwarding features, call recording features, call logging features, conferencing features, transfer features, call center features, call center agent features (e.g., logged in, AVAILABLE, UNVAVAILBLE, After Call Work (ACW), etc.), combinations thereof, or any other known type of communication feature. Said another way, embodiments of the present disclosure cover any feature package built on the SIP eventing mechanism described in RFC 3265, the entire contents of which are incorporated herein by reference. In addition to providing communication features, the servers 104, 108 may also be configured to help establish a communication session between endpoints via utilization of the SIP protocol. In some embodiments, the servers 104, 108 may be used to sequence other applications into a media and/or signaling path of a communication session according to preferences defined for a user of the endpoints involved in the communication session. Furthermore, the servers 104, 108 may also comprise Voice over IP (VoIP) software, video call software, voice messaging software, recording software, an IP voice server, a fax server, a web server, an email server, and the like. Further, in accordance with embodiments of the present disclosure, the servers 104, 106 can include interfaces for various other protocols such as a Lightweight Directory Access Protocol (LDAP), H.248, H.323, Simple Mail Transfer Protocol (SMTP), Internet Message Access Protocol 4 (IMAP4), Integrated Services Digital Network (ISDN), E1/T1, and analog line or trunk.

In the configuration depicted in FIG. 1, the primary server 104 may function as the active server for the endpoint 116 while the endpoint 116 (and user) are involved in a communication session with at least one other endpoint (and user). When properly functioning, the primary server 104 may maintain state information and dialog information for the communication session(s) it supports for the endpoint 116 (and all other supported endpoints for that matter). In some embodiments, the type of state information that may be maintained and monitored at the primary server 104 during a communication session includes, without limitation, feature states and/or dialog states. Non-limiting examples of feature states include: per-call button states, call forward states, states that remain across a login session, states that are saved on the server 104 and remain until a user or system administrator changes them, call center states (e.g., agent IDLE, agent BUSY, agent performing After Call Work (ACW), agent UNAVAILABLE, agent AUX work enabled, agent logged-in, agent logged-off, etc.). Non-limiting examples of dialog states include: call states, conference states, multiple-way calling, hold states, mute states, transfer states, call history, caller identification, etc. As used herein, states may be initiated, changed, or ended by a triggering event or due to, for example, a user action or a server message.

In some embodiments, the primary server 104 receives such state information either directly from the endpoints involved in the communication session, from applications sequenced into the communication session, or from other sources. The primary server 104 may utilize connections 120 and/or 132 to obtain state information and maintain state information synchronization with the endpoint 116. Accordingly, the endpoint 116 may also maintain state information for its communication sessions. The state information may be maintained for a period of time after a communication session has ended or the state information may be deleted from memory of the endpoint 116. In some embodiments, the primary server 104 has an active subscription to the endpoint 116 and vice versa, thereby enabling the primary server 104 and endpoint 116 to maintain their state synchronization. In other embodiments, a server in the session plane 112 may also initiate a state sync to 104/108 without telling and/or needing a trigger from the endpoint 116. When the session plane 112 receives a response from a server 104, 108, the session plane 112 can send the response to the endpoint 116. In other cases, the endpoint 116 can initiate the sync operation.

As a non-limiting example, if a user has activated a twinning or extension-to-cellular feature at the endpoint 116, the endpoint's 116 local state information is shared to the primary server 104 due to the active registration. Furthermore, if the user is involved in a communication session and places the far end on hold to take another call, the on-hold information is sent from the endpoint 116 to the primary server 104. As still another example, if the user corresponds to a contact center agent and the agent is currently logged-in and has enabled Auxiliary work, then the agent's state (e.g., logged-in and AUX work enabled) is shared between the endpoint 116 and primary server 104. Likewise, any state information that is detected or determined at the primary server 104 may be shared to the endpoint 116 via connections 120, 132.

While the primary server 104 is supporting a communication session for the endpoint 116, the survivable server 108 may not be receiving current state information from either the primary server 104 or endpoint 116. In other words, the survivable server 108 may not necessarily have state synchronization with the devices actively involved in a communication session. Instead, the survivable server 108 may have state information about the endpoint 116 that is static in nature and was administered prior to the initiation of a communication session. The survivable server 108 may also have some state information about a communication session, but such state information may not necessarily be communicated to the survivable server 108 during run-time or in synchronization with the communications between the primary server 104 and endpoint 116. Said another way, the survivable server 108 may not actively subscribe to state information from either the endpoint 116 or the primary server 104. Thus, the connection 124 may only be used to help the survivable server 108 determine if, and when, the primary server 104 fails. In other embodiments, there may not actually be a connection 124 between servers 104, 108. Instead, the servers 104, 108 may only have an indirect connection via the session plane 112.

In some embodiments, the session plane 112 corresponds to a server, collection of servers, and/or collection of communication equipment that provides session management functions. In particular, the session plane 112 may correspond to a plurality of B2BUAs and/or proxies that are configured to help route call set-up messages between and endpoint 116 and servers 104, 108. For example, the session plane 112 may be configured to route one or more call set-up messages to an appropriate server (e.g., primary server 104) for calls initiated by or directed toward user and/or endpoint 116. In some embodiments, the session plane 112 may have access to a list of users and their authoritative servers to help achieve such routing. The session plane 112 may additionally or alternatively comprise a plurality of media control components.

As can be seen in FIGS. 2 and 3, if communications between the primary server 104 and endpoint 116 fail (e.g., either due to the failure of the primary server 104 or due to a network failure between the primary server 104 and endpoint 116), then the survivable server 108 may be asked to take over responsibilities for the primary server 104. Initially, the survivable server 108 may not comprise current state information for the communication sessions(s) in which the endpoint 116 was involved and/or current feature information about features enabled at the endpoint 116. Thus, it may be necessary to provide current feature and/or dialog information to the survivable server 108 to enable a successful failover to the survivable server 108.

Figure 4:
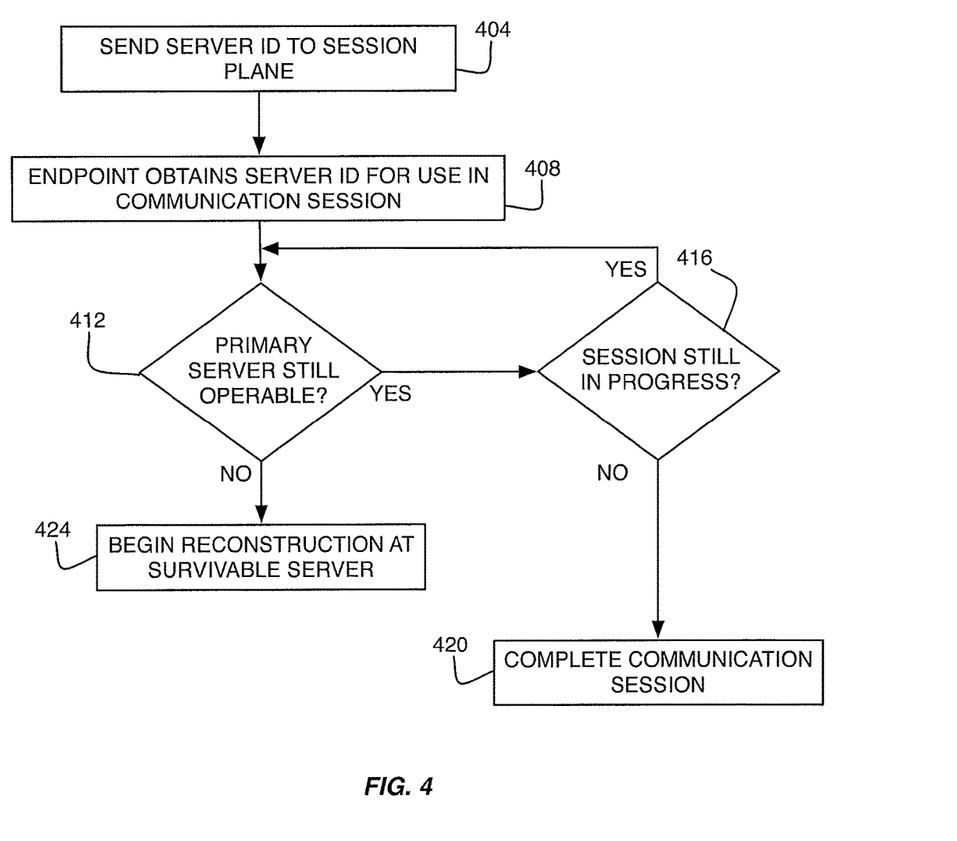
FIG. 4 is a flow diagram depicting a method of detecting server inoperability and initiating failover in accordance with embodiments of the present disclosure.

With reference now to FIG. 4, details of a method for initiating failover to the survivable server 108 in response to a failed primary server 104 will be described in accordance with embodiments of the present disclosure. The method begins with the primary server 104 sending its server-ID (e.g., server-ID-primary) to the session plane 112 (step 404). Typically, failure of the primary server 104 may be detected by the session plane 112, which will trigger the session plane 112 to send a re-subscribe request to the survivable server 108. This causes the survivable server 108 to respond with whatever it knows and the session plane 112 forwards the survivable server's 108 response to the endpoint 116. In some embodiments, every server connected to the session plane 112 sends down its respective server-ID to the session plane 112 in response to the re-subscribe request. In some embodiments, the survivable server 108 may send its server-ID to the session plane 112 with every notification message sent from the survivable server 108 to the session plane 112. The server-ID may correspond to an alpha-numeric string, a series of numbers, characters, symbols, or the like that substantially uniquely identify the server among the network of servers connected to the session plane 112. The server-IDs from each of the servers connected to the session plane 112 may be maintained in memory of a server administering the session plane 112, in memory of an endpoint 116, or in some data repository available to the session plane 112 and/or the endpoint 116. Additionally or alternatively, the server-IDs may be maintained in a database or table that is accessible to the session plane 112 and/or endpoint 116.

The method continues when an endpoint 116 obtains a server-ID (e.g., server-ID-primary) from the session plane 112 for use in a communication session (step 408). In particular, the session plane 112 sends the response received from the survivable server 108 to the endpoint 116. In this step, the endpoint 116 may receive the server-ID in response to the endpoint 116 initiating a communication session (e.g., sending an INVITE message or the like), in response to the endpoint 116 being the target of a call (e.g., the endpoint 116 being identified in the TO header of an INVITE message), or the like. Thus, as part of initiating a communication session that involves the endpoint 116, the endpoint 116 may ask for or automatically receive the server-ID of the server that will provide one or more features to the endpoint 116 during the communication session. In this particular example, the primary server 104 may correspond to the server that was initially selected to provide the communication features to the endpoint 116 during the communication session. This selection may occur within the session plane 112, for example, due to the fact that the primary server 104 is authoritative for the user of the endpoint 116. Of course, any other selection mechanism may have resulted in the primary server 104 being selected for servicing the endpoint 116 during the communication session. It should also be noted that there may be multiple calls on the endpoint 116, each being serviced by a different server at the same time. Similarly, the endpoint 116 can have different buttons and/or features activated that are serviced by different feature servers. In the scenario where an endpoint is involved in multiple calls and/or has multiple features activated, the server-ID described above may correspond to each server-ID for every call and/or feature.

The server-ID will come down to the endpoint 116 as described above with every call (e.g., INVITE and/or response) and with every feature invocation notification (e.g., feature state notification XML package). For example, a feature state notification package may be depicted as follows:

```
<feature-status>
    <feature1>
        ..states / whatever else
        <serverid>xxx</serverid>
    </feature1>
    <feature2>
        ..more states / whatever else
        <serverid>xxx</serverid>
    </feature2>
</feature-status>
```

After the endpoint 116 receives the server-ID, the primary server 104 and/or session plane 112 complete any necessary steps to establish the communication session between the endpoint 116 and any number of other far end endpoints. In other words, the endpoint 116 may be involved in a communication session with a single far end endpoint, or the endpoint 116 may be involved in a conference call with a plurality of endpoints. As the communication session progresses, the determination is made as to whether or not the primary server 104 is still operable to provide the communication functions to the endpoint 116 (step 412). This determination may be made at the session plane 112 and/or by the endpoint 116. If the primary server 104 is still operable (e.g., the server has not failed and there is still network connectivity between the primary server 104 and endpoint 116), then the method proceeds by determining whether or not the session is still in progress (step 416). If the session is still in progress, then the method reverts back to step 412. If the session has ended, the call is ended in the normal way and the endpoint 116 may delete the server-ID of the primary server 104 from its memory cache or perform any other session completion processes (step 420). Completion of the communication session may also relieve resources of the primary server 104 (e.g., memory, processors, network ports, etc.) to provide communication features to other endpoints involved in other communication sessions.

Referring back to step 412, if the primary server 104 is determined to be no longer operable, then the method initiates a feature and/or dialog reconstruction at the survivable server 108 (step 424). The reconstruction of features, for example, may be achieved by allowing the survivable server 108 to exchange server-ID information with the endpoint 116 via the session plane 112. The endpoint 116 may then provide the survivable server 108 information about its currently-activated features. Once the survivable server 108 receives this feature information from the endpoint 116, the survivable server 108 can reconfigure itself to begin providing those same features to the endpoint 116.

The reconstruction of a dialog, on the other hand, may require a few additional steps by the survivable server 108. For instance, the endpoint 116 may inform the survivable server 108 of its view of the dialogs. Server will keep that in memory. It will then start looking out for messages related to that dialog to flow through it. Only then will the server confirm that the dialog is reconstructed. Other differences between dialog reconstruction and feature reconstruction is that dialog reconstruction should be performed in real-time, is relatively complex as compared to feature reconstruction, and only partial data may be available in connection with the dialog reconstruction.

Figure 5:
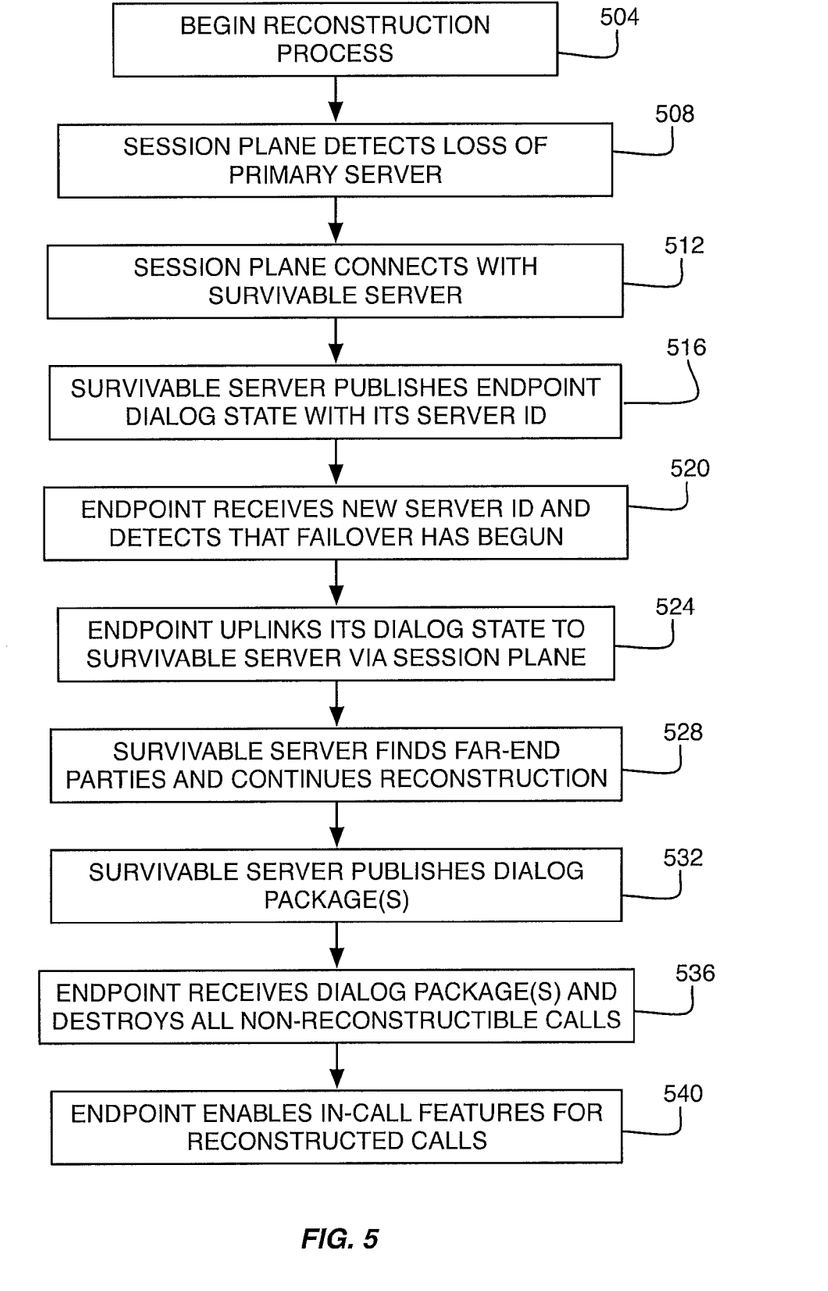
FIG. 5 is a flow diagram depicting a method of feature reconstruction in accordance with embodiments of the present disclosure.

With reference now to FIG. 5, additional details of a feature reconstruction process will be described in accordance with at least some embodiments of the present disclosure. The method begins with the initiation of the reconstruction process (step 504). This step may be triggered in response to step 424 being executed in FIG. 4.

Prior to the initiation of the reconstruction, the primary server 104 may have maintained a complete set of state information for the endpoint 116, for features activated on the endpoint 116, and/or dialog information for the communication session being serviced by the primary server 104. Some or all of this up-to-date state information may not necessarily be maintained at the survivable server 108 when the reconstruction process begins. Accordingly, when the reconstruction process begins, the session plane 112 may detect the loss of the primary server 104 (step 508) and establishes a connection with the survivable server 108 in response to detecting the failure (step 512). In some embodiments, the session plane 112 may send the survivable server 108 a re-subscribe request to the survivable server 108 or the survivable server 108 may unilaterally send down its state information to the session plane 112. Upon receiving the re-subscribe request from the session plane 112, the survivable server 108 may respond by publishing the current endpoint dialog state as viewed by the survivable server 108 (step 516). This published endpoint state information may not be up-to-date with the current state. In some embodiments, the state information may indicate that the survivable server 108 believes the endpoint 116 is idle and no features are activated at the endpoint 116. Along with the state information, the survivable server 108 may also publish its server-ID (e.g., server-ID-survivable) to the session plane 112.

Thereafter, the session plane 112 may transmit the state information received from the survivable server 108 to the endpoint 116 involved in the communication session (step 520). Along with the published state information, the endpoint 116 may also receive the server-ID of the survivable server 108 (e.g., server-ID-survivable). The endpoint 116 now knows that failover has begun because the endpoint 116 compares the recently received server-ID and determines that it does not match the server-ID initially received from the primary server 104. Even more specifically, the endpoint 116 may compare the recently received server-ID with server-IDs on a feature-by-feature basis and/or every server-ID associated with an in-progress dialog. In particular, the endpoint 116 is configured to determine that server-ID-primary does not equal server-ID-survivable for one or more of an invoked feature and/or an in-progress dialog. The endpoint 116 may further determine that the state information received from the survivable server 108 does not match the endpoint's view of the state information.

For optimization, if there is a mismatch between the server-IDs and/or the states on a per-call/per dialog basis, the endpoint 116 uplinks its feature/dialog state information to the survivable server 108 via the session plane 112 (step 524). In response to receiving this information from the endpoint 116, the survivable server 108 begins the process of reconstructing its state information to match the state information received from the endpoint 116 (step 528). Specifically, the survivable server 108 begins a reconstruction of the dialogs in which the endpoint 116 is involved by placing the dialog(s) is a partially reconstructed state. Unfortunately, since the dialog ID initially sent from the endpoint 116 will be mangled by any number of B2BUAs in the path to the survivable server 108, the dialog ID does not provide the survivable server 108 much relevance for reconstruction. Instead, the survivable server 108 will utilize other information received from the endpoint 116 to reconstruct the dialogs for the endpoint 116. In some embodiments, the survivable server 108 utilizes one or more GSIDs, one or more GRUUs, and/or one or more EPVs received from the endpoint 116 to reconstruct the dialogs. The one or more GSIDs may correspond to a unique identifier of the call and, thereby, parties in the call. The one or more EPVs may provide the survivable server 108 with the endpoint's 116 latest instance (e.g., enabled features, feature states, etc.) as well as the endpoint's 116 view of the dialog. The details of GSIDs, GRUUs, and EPVs are discussed further in U.S. patent application Ser. Nos. 13/626,066 and 13/485,604. More specifically, the survivable server 108 is configured to try and locate far-end parties on an in-progress call by matching the GSID and EPV received from the endpoint 116 with GSIDs and EPVs currently in use by far-end parties. In the interim of the reconstruction, the survivable server 108 may place the call into a reconstruction pending state. In some embodiments, the survivable server 108 may also publish the interim states to the endpoints 116.

The survivable server 108 is configured to utilize the GSID and/or EPV information received from the endpoint 116 to update its state information in synchronization with the endpoint's 116 state information. After the state information has been updated internally at the survivable server 108, the method continues with the survivable server publishing one or more dialog packages to the session plane 112, the endpoint 116, and/or one or more far-end device involved in the in-progress communication session with the endpoint 116 (step 532). In this step, the survivable server 108 publishes a dialog package that contains the server-ID-survivable and an indication that the dialog is a reconstruction of a dialog previously owned by server-ID-primary. This can be done on a per-dialog basis.

The endpoint 116 then receives the dialog package(s) that have been published by the survivable server 108 (step 536). Upon receiving the updated dialog package(s) from the survivable server 108, the endpoint 116 may now see that the survivable server 108 has reconstructed each of the endpoint's 116 calls from the primary server 104. If any of the calls could not be reconstructed by the survivable server 108 (e.g., because the survivable server 108 did not change the server-ID for the call), the endpoint 116 will know that particular call was not reconstructed. Therefore, this step may also include the endpoint 116 will continue with the non-reconstructed call as long as the media stream is up, but will otherwise destroy all non-reconstructed calls, which is similar to the behavior performed today with on-hook processing or any similar process where an endpoint 116 sends a new call to a server that causes the server to clean up the call at a given line appearance.

For all reconstructed calls, however, the endpoint 116 can enable in-call features to be provided by the survivable server 108 (step 540). All of the reconstruction described herein may be completely transparent to the user of the endpoint 116. Moreover, once the survivable server 108 has successfully reconstructed the state information and dialog information, the endpoint 116 can continue using any in-call features on the reconstructed call.

Figure 6:
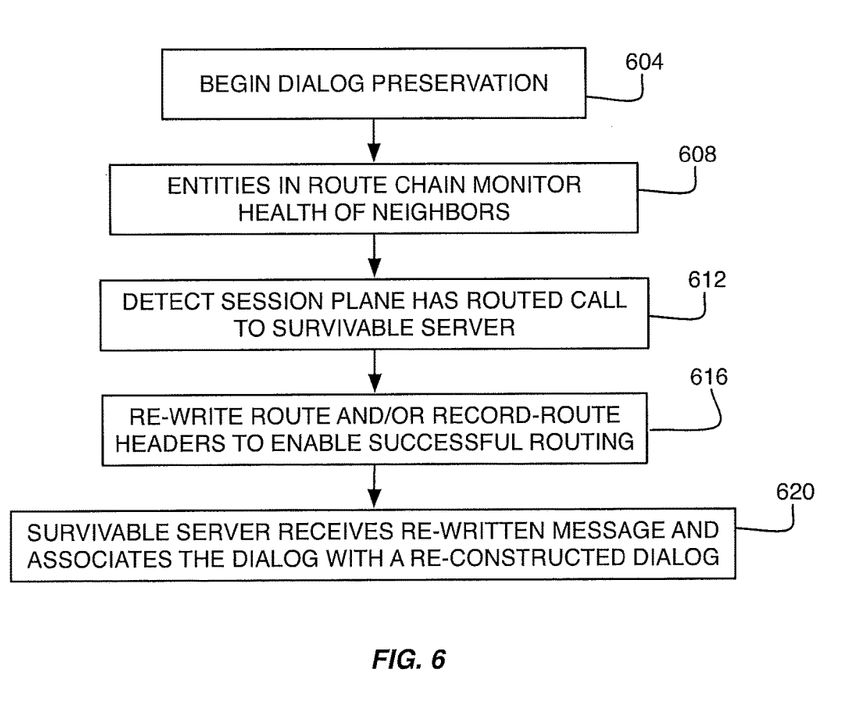
FIG. 6 is a flow diagram depicting a method of dialog preservation in accordance with embodiments of the present disclosure.

With reference now to FIG. 6, additional details of a dialog preservation method will be described in accordance with at least some embodiments of the present disclosure. The method may be initiated (step 604) in response to detecting a failure of the primary server 104 during a communication session as described in connection with FIG. 4. The dialog preservation method utilizes the fact that entities in a route chain (e.g., sequenced applications, B2BUAs, proxies, etc.) are monitoring the health of their next and previous hops (e.g., neighbors) (step 608). This health monitoring can be done either by administration or by automatic learning (e.g., execution of an OPTIONs method). During the health monitoring phase, the entities in the route chain can quickly become aware of failover groups and can route to alternate entities within the failover group.

Therefore, if the session plane 112 routes messages during a communication session to the primary server 104 and then the primary server 104 is no longer reachable, then the session plane 112 will re-route the message to the survivable server 108 (step 612). This re-routing basically requires the session plane 112 to re-write the route and/or record-route headers in the messages (e.g., requests and responses thereto) with the address of an active member in the failover group to route the message successfully to the active member (e.g., the survivable server 108) (step 616). Once the survivable server 108 receives the re-routed message, the survivable server 108 can associate the dialog with a reconstructed dialog, thereby enabling the survivable server 108 to provide the desired features to the endpoint 116 in connection with the communication session (step 620).

It should be appreciated that while the examples discussed herein were generally related to SIP-based communications, embodiments of the present disclosure are not so limited. Specifically, non-SIP devices may also benefit from embodiments of the present disclosure. Even more specifically, reconstruction of non-SIP device features and states can be achieved by using SIP tunnels.

In some embodiments, states for any endpoint can be reconstructed with a SIP abstraction layer. The way this can be accomplished is to register two different endpoints—one SIP and the other non-SIP to the same number, say 3000. Now, assume that 3000 is a H323 phone, turns on some features and the server dies. All this while the 3000 SIP phone was just shadowing and mirroring the states of the 3000 H.323 phone. When the server dies and a new server takes over, the 3000 SIP phone will initiate reconstruction. This will change the new server's view of 3000 and, hence, the update states will be sent down to 3000 H.323 as well. This stems off from a feature called dual registration which enables two endpoints (e.g., one SIP and one H.323 endpoint) to both register to the same number.

To further illustrate the above point, consider the following dialog:
E1 - - - proxy - - - feature server1 (FS1) - - - proxy - - - feature server 2 (FS2) - - - etc - - - proxy - - - E2

Typically, the feature servers change dialogs, since they are implemented as B2BUAs. So, E1-FS1 is dialog 1, FS1 to FS2 is dialog 2, etc.

Now assume FS2 dies and further assume that it is the one managing dialog states of the endpoints (E1 and E2). Reconstruction of the dialog information may be achieved by performing the following process:

1. FS2 (e.g., primary server 104) dies, FS2.1 (e.g., survivable server 108) comes up in its place.

2. The proxy which continues to perform heartbeat with FS2 realizes the failure has occurred and now is ready to send the next request for FS2 to FS2.1 (e.g., because FS2.1 is in an alternate failover group, which can be statically administered or dynamically learned). FS2.1 may be discovered in response to a message/heartbeat that indicates which is the alternate server for FS2 for both new and existing calls.

3. Proxy will re-write Route and Record-route headers of FS2 in messages with FS2.1. Whenever it does, it will add a flag saying 'reconstructed call'.

4. FS2.1 will not ignore any messages from proxy (trusted neighbor) for dialogs of which it is not aware and that contain the 'reconstructed call' flag (the flag will cause FS2.1 to process this potentially stray message that it knows nothing about).

5. FS2.1 will try to reconstruct the call and parties in the call based on the information present in the message—The GSID, GRUU, and/or EPVs of both endpoints may be provided to FS2.1 to assist in this process.

6. When FS2.1 receives this information FS2.1 will start reconstructing the calls internally and will tag them as 'partially reconstructed'. Once it gets information about both the parties in the call and is able to completely reconstruct the call, it will move the call to a 'fully reconstructed' state.

As second aspect of the endpoint-server interaction is that:

1. When the new FS 2.1 comes up. It will send down the publish towards the endpoint. This could be server initiated or a notification sent in response to a subscribe/publish query by the proxy. This publish contains the server-ID.

2. The endpoint then gets the published information and knows that the server has changed by virtue of determining that FS2.1's view of state information is not consistent with its current state.

3. Endpoint uplinks its current state to FS2.1 (e.g., via proxies of course). It should be noted that the order of going from a server that has no real-time information to a fully reconstructed server are: (1) proxy can route message to this backup server (e.g., by changing headers) and (2) endpoint 116 can supply its dialog state information to the backup server. The order of performing (1) and (2) is flexible in that (2) can be performed prior to (1).

4. FS2.1 gets this new state information from the endpoint(s), which will be enhanced to provide the EPV information, for example. Now FS2.1 can create a call and place parties into it. Moreover, the FS2.1 can keep the call as a partially reconstructed call during reconstruction.

5. FS2.1 will send a downlink to the endpoint stating that it is now reconstructing the call. The dialogs will contain a 'partial reconstructed' or 'fully reconstructed' tags. Endpoints can use this to inform the user and/or deny local features, etc.

6. Once FS2.1 has completed the reconstruction, it will send out another downlink message to the endpoints stating that reconstruction is complete.

7. In many cases, as FS2.1 gets signaling messages flowing via it (above), the FS2.1 can confirm the state of call and parties and improve the reconstruction level of the call.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
   determining, by a microprocessor, that a primary Session Initiation Protocol (SIP) server involved in an established SIP communication session between at least a first user communication endpoint and at least a second user communication endpoint has failed during the established SIP communication session;
   determining, by the microprocessor, that a survivable SIP server will replace the primary SIP server, wherein the survivable SIP server does not comprise current information for the established SIP communication session, and wherein the current information comprises at least one of state information and feature information;
   receiving, by the microprocessor, the current information for the established SIP communication session from the at least a first user communication endpoint, wherein the current information is necessary to maintain the established SIP communication session from a current state as viewed by the at least a first user communication endpoint;
   providing, by the microprocessor, the current information for the established SIP communication session received from the at least a first user communication endpoint to the survivable SIP server, wherein the provided current information enables the survivable SIP server to reconstruct the at least one of the state information and the feature information for the established SIP communication session; and
   enabling, by the microprocessor, the at least a first user communication endpoint to continue the established SIP communication session during the reconstruction of the at least one of the state information and the feature information.

2. The method of claim 1, wherein the state information about the established SIP communication session as viewed by the at least a first user communication endpoint includes one of a Global Session Identifier (GSID), a Globally Routable UA URI (GRUU), or an Endpoint View (EPV) header, and wherein the state information about the established SIP communication session as viewed by the at least a first user communication endpoint includes the EPV header, wherein the EPV header comprises the at least a first user communication endpoint's view of a dialog of the established SIP communication session and wherein the EVP header causes the survivable SIP server to reconstruct one or more SIP dialogs to reconstruct the established SIP communication session.

3. The method of claim 2, wherein the state information about the established SIP communication session as viewed by the at least a first user communication endpoint includes two or more of the GSID, GRUU, and EPV header.

4. The method of claim 2, wherein the state information about the established SIP communication session as viewed by the at least a first user communication endpoint includes the GSID and wherein the GSID provides a substantially unique identification of the established SIP communication session.

5. The method of claim 1, wherein the survivable SIP server comprises published information regarding the established SIP communication session and the published information does not match the current information from the at least a first user communication endpoint.

6. The method of claim 1, wherein the provided current information comprises a server-ID which substantially uniquely identifies the survivable SIP server.

7. The method of claim 6, wherein the first user communication endpoint determines that the server-ID does not match an initial server-ID received from the primary SIP server, and wherein the reconstruction of the at least one of the state information and the feature information is based on the determination that the server-ID does not match the initial server ID.

8. The method of claim 1, wherein the provided current information comprises the state information, and wherein the provided current information causes the survivable SIP server to place the established SIP communication session in a reconstruction pending state while the survivable SIP server reconstructs the state information for the established SIP communication session.

9. The method of claim 1, the method further comprising:
the microprocessor monitoring health of a neighbor entity in a route path of the established SIP communication session;
the microprocessor determining that the primary SIP server has failed during the monitoring of health of the neighbor entity;
re-writing, by the microprocessor, at least one of a route and record-route header in a message transmitted during the established SIP communication session to include an address of the survivable SIP server; and
enabling, by the microprocessor, the survivable SIP server to associate a reconstructed SIP dialog with an original SIP dialog of the established SIP communication session in response to receiving the re-written message.

10. The method of claim 1, wherein the primary SIP server and the survivable SIP server both behave as one of a Back-to-Back User Agent (B2BUA) or proxy in the established SIP communication session.

11. The method of claim 1, wherein the established SIP communication session corresponds to a conference call between the at least a first user communication endpoint, the at least a second user communication endpoint, and at least a third user communication endpoint.

12. A communication system, comprising:
a microprocessor; and
a computer readable medium, coupled with the microprocessor and comprising microprocessor readable and executable instructions that program the microprocessor to execute:
a survivable Session Initiation Protocol (SIP) server configured to:
take over service of an established SIP communication session, when a primary SIP server that initially serviced the established SIP communication session fails during the established SIP communication session, by the survivable SIP server receiving current information about the established SIP communication session from a first user communication endpoint after a time of the failure of the primary SIP server, wherein the survivable SIP server does not comprise the current information for the established SIP communication session at the time of the failure of the primary SIP server, and wherein the current information comprises at least one of state information and feature information from the time of the failure; and
reconstruct the at least one of the state information and the feature information for the established SIP communication session based on the current information received from the first user communication endpoint.

13. The communication system of claim 12, wherein the state information about the established SIP communication session as viewed by the at least a first user communication endpoint includes at least one of a Globally Routable UA URI (GRUU) and an Endpoint View (EPV) header.

14. The communication system of claim 12, wherein the EPV header comprises at least a portion of the current information about the established SIP communication session as viewed by the at least the first user communication endpoint, and wherein the reconstruction is based on the at least the portion of the current information from the EPV header received by the survivable SIP server from the first user communication endpoint.

15. The communication system of claim 14, wherein the reconstruction is based on one or more dialogs at the time of the failure, and wherein the survivable SIP server uses the at least the portion of the current information from the EVP header to reconstruct the one or more dialogs from the view of the at least the first user communication endpoint.

16. The communication system of claim 12, wherein the state information about the established SIP communication session as viewed by the at least a first user communication endpoint includes a Global Session Identifier (GSID) and an Endpoint View (EPV) header, and wherein the survivable SIP server locates far-end parties to the established SIP communication session by matching the GSID and EPV header with a GSID and EPV currently in use by the far-end parties.

17. The communication system of claim 12, whereby the survivable SIP server preserves SIP dialog information for the established SIP communication session based on the current information received from the first user communication endpoint.

18. The communication system of claim 12, wherein the state information about the established SIP communication session as viewed by the at least a first user communication endpoint includes a Globally Routable UA URI (GRUU).

19. The communication system of claim 12, wherein the reconstruction of the state information is done transparently to a user of the first user communication endpoint using a confirmation of the reconstruction sent to the first user communication endpoint.

20. The communication system of claim 12, wherein the state information comprises one of dialog state information, feature state information, contact center state information, or non-call state information.

* * * * *